(12) United States Patent
Salter et al.

(10) Patent No.: US 10,053,006 B1
(45) Date of Patent: Aug. 21, 2018

(54) ILLUMINATED ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/420,779

(22) Filed: Jan. 31, 2017

(51) Int. Cl.
  *B60Q 1/00* (2006.01)
  *B60Q 9/00* (2006.01)
  *B60Q 3/78* (2017.01)
  *B60Q 3/80* (2017.01)
  *F21V 3/04* (2018.01)
  *F21V 9/16* (2006.01)
  *F21K 9/64* (2016.01)
  *F21V 9/08* (2018.01)
  *F21V 3/06* (2018.01)
  *F21V 9/30* (2018.01)

(52) U.S. Cl.
  CPC .............. *B60Q 9/00* (2013.01); *B60Q 3/78* (2017.02); *B60Q 3/80* (2017.02); *F21K 9/64* (2016.08); *F21V 3/0409* (2013.01); *F21V 3/06* (2018.02); *F21V 9/08* (2013.01); *F21V 9/16* (2013.01); *F21V 9/30* (2018.02); *B60Q 2500/10* (2013.01)

(58) Field of Classification Search
  CPC ... B60Q 9/00; B60Q 3/78; B60Q 3/80; B60Q 2500/10; F21K 9/64; F21V 3/0409; F21V 9/08; F21V 9/16

USPC .......................................................... 340/457
See application file for complete search history.

(56) References Cited

U.S. PATENT DOCUMENTS 2,486,859 A    11/1949  Meijer et al.
3,756,712 A *  9/1973  Weisglass ............. G03B 27/73
                                              355/32

(Continued)

FOREIGN PATENT DOCUMENTS

CN    101337492 A    1/2009
CN    201169230 Y    2/2009

(Continued)

OTHER PUBLICATIONS

Evonik Industries, "Acrylite LED (EndLighten)—Light Guiding Edge Lit Acrylic," Technical Information, obtained from the Internet Jan. 13, 2016, 10 pages, Evonik Cyro LLC, Parsippany, New Jersey, USA.

(Continued)

*Primary Examiner* — Omer S Khan
(74) *Attorney, Agent, or Firm* — Vichit Chea; Price Heneveld LLP (57) ABSTRACT

An illuminated assembly is provided herein that includes a light-diffusing element disposed between an outer panel and an inner panel. A light source is configured to direct light into a first portion of the light-diffusing element. A seal is disposed between the outer and inner panels. The outer and inner panels extend beyond the seal in two opposing directions. A controller is configured to illuminate the light source to provide notifications about a vehicle outwardly of the vehicle.

11 Claims, 7 Drawing Sheets

(56) References Cited

U.S. PATENT DOCUMENTS

| | | | |
|---|---|---|---|
| 4,226,063 A * | 10/1980 | Chenel | E06B 3/677 |
| | | | 52/172 |
| 5,053,930 A | 10/1991 | Benavides | |
| 5,060,118 A | 10/1991 | Penrod et al. | |
| 5,434,013 A | 7/1995 | Fernandez | |
| 5,709,453 A | 1/1998 | Krent et al. | |
| 5,839,718 A | 11/1998 | Hase et al. | |
| 6,019,411 A | 2/2000 | Carter et al. | |
| 6,031,511 A | 2/2000 | DeLuca et al. | |
| 6,117,362 A | 9/2000 | Yen et al. | |
| 6,132,072 A | 10/2000 | Turnbull et al. | |
| 6,203,181 B1 | 3/2001 | Gross | |
| 6,260,988 B1 | 7/2001 | Misawa et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,631,575 B1 | 10/2003 | Voelzke et al. | |
| 6,666,571 B2 | 12/2003 | Becher et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,829,852 B1 | 12/2004 | Uehran | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,354,182 B2 | 4/2008 | Bartels | |
| 7,441,914 B2 | 10/2008 | Palmer et al. | |
| 7,458,698 B2 | 12/2008 | Heathcock et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,103,414 B2 | 1/2012 | Boss et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,765 B2 | 4/2013 | Kuhlman et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,937,454 B2 | 1/2015 | Baarman et al. | |
| 8,952,341 B2 | 2/2015 | Kingsley et al. | |
| 8,963,705 B2 | 2/2015 | Miller et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,194,168 B1 | 11/2015 | Lu et al. | |
| 9,299,887 B2 | 3/2016 | Lowenthal et al. | |
| 9,315,148 B2 | 4/2016 | Schwenke et al. | |
| 9,442,888 B2 | 9/2016 | Stanfield et al. | |
| 9,568,659 B2 | 2/2017 | Verger et al. | |
| 9,579,987 B2 | 2/2017 | Penilla et al. | |
| 9,616,812 B2 | 4/2017 | Sawayanagi | |
| 2002/0159741 A1 | 10/2002 | Graves et al. | |
| 2002/0163792 A1 | 11/2002 | Formosa | |
| 2003/0167668 A1 | 9/2003 | Fuks et al. | |
| 2003/0179548 A1 | 9/2003 | Becker et al. | |
| 2004/0185195 A1 | 9/2004 | Anderson et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0023450 A1 * | 2/2006 | Chung | F21S 8/02 |
| | | | 362/246 |
| 2006/0087826 A1 | 4/2006 | Anderson, Jr. | |
| 2006/0097121 A1 | 5/2006 | Fugate | |
| 2007/0030136 A1 | 2/2007 | Teshima et al. | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251917 A1 | 10/2009 | Wollner et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2010/0208459 A1 * | 8/2010 | Lai | G02B 5/0278 |
| | | | 362/235 |
| 2011/0012062 A1 | 1/2011 | Agrawal et al. | |
| 2012/0001406 A1 | 1/2012 | Paxton et al. | |
| 2012/0020101 A1 | 1/2012 | Pastrick et al. | |
| 2012/0104789 A1 * | 5/2012 | Plavetich | B60Q 1/268 |
| | | | 296/146.14 |
| 2012/0104954 A1 | 5/2012 | Huang | |
| 2012/0183677 A1 | 7/2012 | Agrawal et al. | |
| 2012/0217881 A1 | 8/2012 | Sethi et al. | |
| 2012/0280528 A1 | 11/2012 | Dellock et al. | |
| 2012/0327311 A1 * | 12/2012 | Kuromizu | G02F 1/133603 |
| | | | 348/739 |
| 2013/0009855 A1 | 1/2013 | Gally et al. | |
| 2013/0050979 A1 | 2/2013 | Van De Ven et al. | |
| 2013/0092965 A1 | 4/2013 | Kijima et al. | |
| 2013/0154821 A1 | 6/2013 | Miller et al. | |
| 2013/0238167 A1 | 9/2013 | Stanfield et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |

(56) References Cited

U.S. PATENT DOCUMENTS

| | | |
|---|---|---|
| 2014/0065442 A1 | 3/2014 | Kingsley et al. |
| 2014/0096893 A1 | 4/2014 | Veerasamy |
| 2014/0098557 A1 | 4/2014 | Veerasamy |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0232198 A1* | 8/2015 | Seibt .................. B64D 47/02 362/470 |
| 2015/0267881 A1 | 9/2015 | Salter et al. |
| 2015/0307033 A1 | 10/2015 | Preisler et al. |
| 2015/0324708 A1 | 11/2015 | Skipp et al. |
| 2015/0339928 A1 | 11/2015 | Ramanujam |
| 2015/0346727 A1* | 12/2015 | Ramanujam ....... B62D 15/0285 701/23 |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0131327 A1 | 5/2016 | Moon et al. |
| 2016/0214535 A1 | 7/2016 | Penilla et al. |
| 2016/0236613 A1 | 8/2016 | Trier |
| 2017/0158125 A1 | 6/2017 | Schuett et al. |
| 2017/0213165 A1 | 7/2017 | Stauffer et al. |
| 2017/0258333 A1* | 9/2017 | Shigeta ................ A61B 5/0095 |

FOREIGN PATENT DOCUMENTS

| | | |
|---|---|---|
| CN | 201193011 Y | 2/2009 |
| CN | 202345586 U | 7/2012 |
| CN | 202357840 U | 8/2012 |
| CN | 102881230 A | 1/2013 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10343778 A1 | 5/2004 |
| DE | 10319396 A1 | 11/2004 |
| EP | 1793261 A1 | 6/2007 |
| EP | 1903359 A2 | 3/2008 |
| EP | 2003393 B1 | 5/2012 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

OTHER PUBLICATIONS

Evonik Industries, "Acrylite LED (Endlighten)—Acrylic Sheet and Rod for Edge Lighting," Product Information, obtained from the Internet Jan. 13, 2016, 4 pages, Evonik Cyro LLC, Parsippany, New Jersey, USA.

Evonik Industries, "Acrylite LED for High Efficiency Light Delivery," Product Information, copyright 2012, 2 pages, Evonik Cyro LLC, Parsippany, New Jersey, USA.

Evonik Industries, "Acrylite Specialty Lighting Products," Technical Selection Guide, copyright 2014, Evonik Cyro LLC, Parsippany, New Jersey, USA.

* cited by examiner

ILLUMINATED ASSEMBLY

FIELD OF THE INVENTION

The present invention generally relates to vehicular lighting, and more particularly to lighting provided through windows, sunroofs, moon roofs and other transparent vehicular elements.

BACKGROUND OF THE INVENTION

Vehicular interior lighting, e.g., dome lights, courtesy lights and other roof and side panel interior lighting has generally been realized through various lighting applications. However, there is a need for vehicular lighting solutions that can employ light sources in a low-cost fashion, with minimal packaging constraints and at low manufacturing costs. Further, as light sources continue to be integrated within the vehicle industry, there is a desire by many consumers for unique lighting aesthetics that cannot be achieved through conventional sources.

SUMMARY OF THE INVENTION

According to one aspect of the present disclosure, an illuminated assembly is disclosed that includes a light-diffusing element disposed between an outer panel and an inner panel. A light source is configured to direct light into a first portion of the light-diffusing element. A seal is disposed between the outer and inner panels. The outer and inner panels extend beyond the seal in two opposing directions. A controller is configured to illuminate the light source to provide notifications about a vehicle outwardly of the vehicle.

According to another aspect of the present disclosure, an illuminated assembly is disclosed. The illuminated assembly includes an outer and an inner panel. A light-diffusing element is disposed between the outer and the inner panels having first and second portions. A thickness of the element at the first portion is greater than a thickness at the second portion. A plurality of light sources is configured to direct light into the first portion. The light sources illuminate in a plurality of wavelengths based on a vehicle wait time.

According to yet another aspect of the present disclosure, an illuminated assembly is disclosed that includes a panel and a light-diffusing element disposed inwardly of the panel. A light barrier is disposed on an opposing side of the light-diffusing element from the panel. A light source is configured to direct light into the light-diffusing element at a plurality of wavelengths to provide notification outwardly from a vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
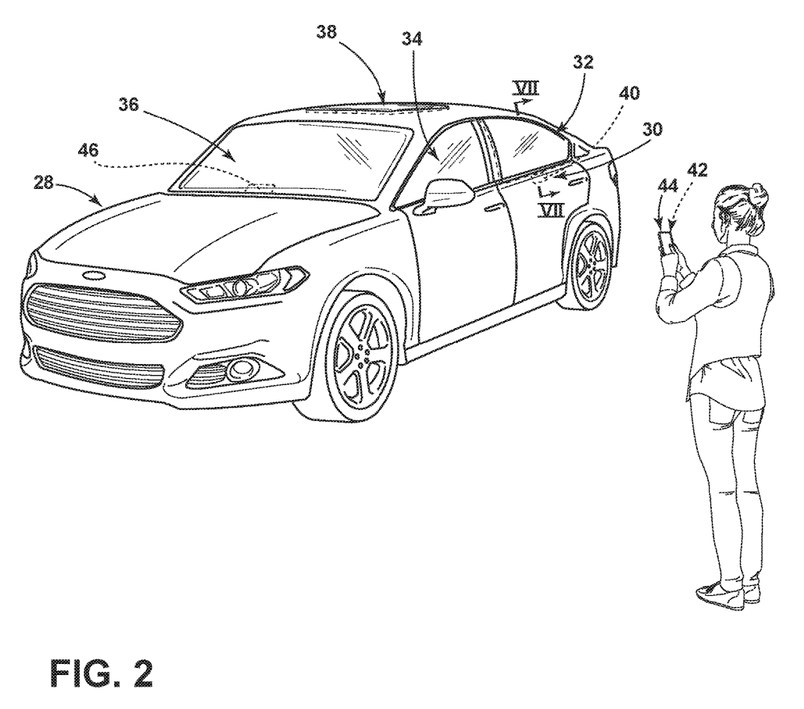
FIG. 2 is a front perspective view of a vehicle containing one or more illuminated window assemblies according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a window. In some embodiments, the illumination assembly causes the window to emanate various wavelengths of light to notify persons proximate the window of a change in status of the structure supporting the window. The illumination assembly may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
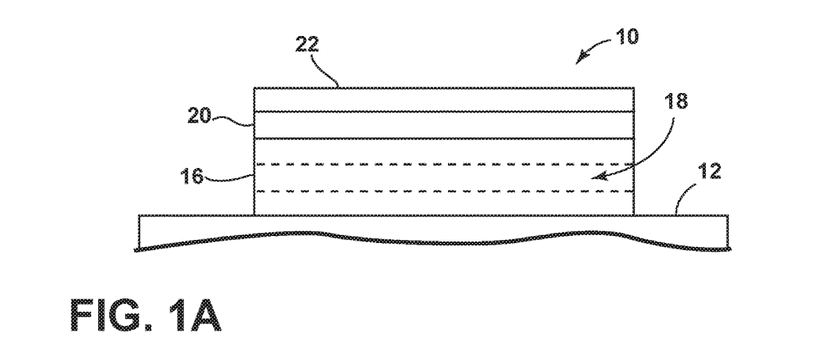
FIG. 1A is a side view of a luminescent structure rendered as a coating for use in a luminescent latch assembly according to one embodiment.
Figure 1B:
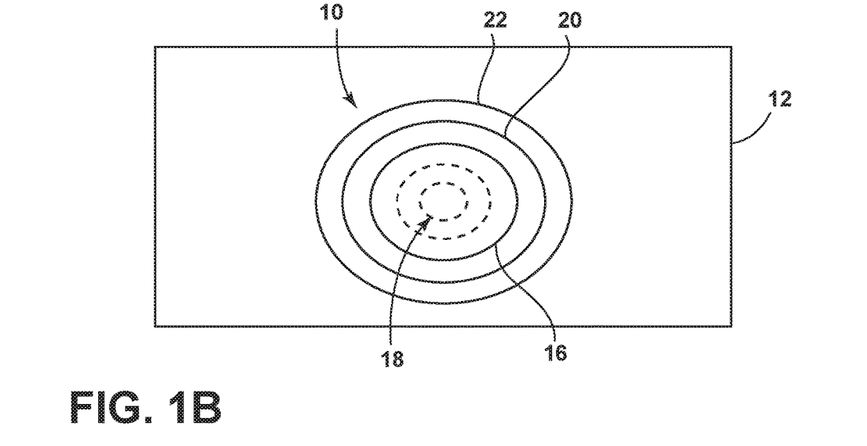
FIG. 1B is a top view of a luminescent structure rendered as a discrete particle according to one embodiment.
Figure 1C:
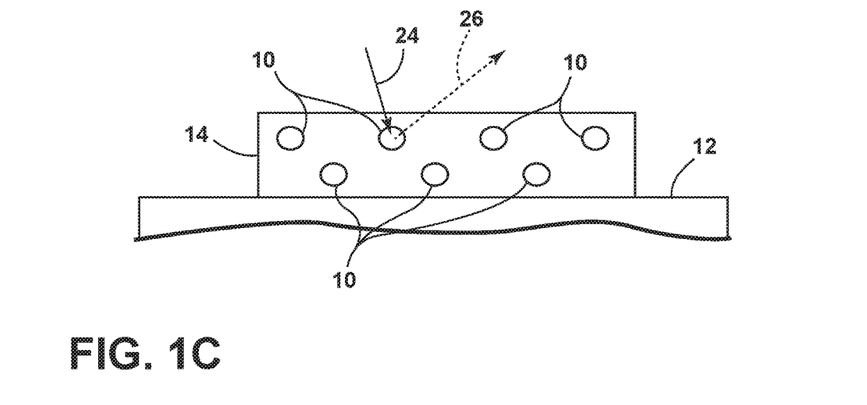
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 40 (FIG. 2) (such as an ambient light source and/or the sun) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat.

No. 9,057,021 to Kingsley et al., and U.S. Pat. No. 8,846,184 to Agrawal et al., all of which are incorporated herein by reference in its entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 40. According to one embodiment, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to one embodiment, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 40). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to one embodiment, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 40 that emit the excitation light 24, including, but not limited to, natural light sources (e.g., the sun) and/or any artificial light sources. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure Li2ZnGeO4 and may be prepared by a high temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S.

Pat. No. 6,117,362 to Yen et al., and U.S. Pat. No. 8,952,341 to Kingsley et al., all of which are incorporated herein by reference in their entirety.

Referring to FIG. 2, a vehicle 28 is depicted with an illuminated assembly 30 integrated within a rear passenger window 32. However, it will be appreciated that the illuminated assembly 30 provided herein may be disposed within a front passenger window 34, a windshield 36, a moon roof 38, a rear window, and/or any within any other clear and/or translucent assembly within the vehicle 28. When the illuminated assembly 30 is activated, a light pattern is transmitted outwardly from the vehicle 28 from one or more light sources 40 contained within, or otherwise coupled to, the window assembly 30 that provides a notification to occupants disposed within and/or around the vehicle 28. Some light from the one or more light sources 40 may also enter the interior of the vehicle 28 and may be used for any purpose. For example, the light within the vehicle 28 may be utilized as a dome light in some embodiments. In some aspects, these light patterns produced by the assembly 30 can also function to provide an interesting lighting aesthetic (e.g., mood lighting) for the vehicle 28.

Referring still to FIG. 2, the vehicle 28 may be utilized for personal and/or commercial purposes, such as for ride-providing (chauffeuring) services and/or ride-sharing services. An application 42 associated with the commercial purpose of the vehicle 28 may be installed on a user's electronic device 44. The application 42 may be configured to communicate with the vehicle 28 (either directly and/or through a remote station) and/or a vehicle associated electronic device 46 that may be disposed within the vehicle 28 and/or remotely disposed. Through the communication between the user's electronic device 44 and the vehicle associated electronic device 46, a commercial relationship may be established in which the vehicle 28 is used to facilitate a service.

The user's electronic device 44 and the vehicle associated electronic device 46 may be any one of a variety of computing devices and may include a processor and a memory. For example, the user's electronic device 44 and the vehicle associated electronic device 46 may be a cellphone, mobile communication device, a key fob, wearable device (e.g., fitness band, watch, glasses, jewelry, wallet), apparel (e.g., a tee shirt, gloves, shoes or other accessories), personal digital assistant, headphones and/or other devices that includes capabilities for wireless communications using IEEE 2.11, Bluetooth, and/or any other wired or wireless communications protocols. Further, the vehicle associated electronic device 46 may be a computer, or any other electronic device, that is disposed within the vehicle.

In various examples, the vehicle 28 and/or the vehicle associated electronic device 46 may communicate with the user's electronic device 44 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 2.11, etc.), local area networks (LAN) and/or wide area networks (WAN), including the Internet, providing data communication services.

Moreover, the vehicle 28 and/or the vehicle associated electronic device 46 may include a wireless transceiver (e.g., a BLUETOOTH module, a ZIGBEE transceiver, a Wi-Fi transceiver, an IrDA transceiver, an RFID transceiver, etc.) configured to communicate with a compatible wireless transceiver of the user's electronic device 44. Additionally or alternately, the vehicle 28 and/or the vehicle associated electronic device 46 may communicate with the user's electronic device 44 over a wired connection, such as via a USB connection.

The application 42 may be configured to utilize a device link interface to interact with the vehicle 28 and/or the vehicle associated electronic device 46. When connected to the vehicle 28, the application 42 may be configured to utilize information from vehicle sensors, actuators, and electronic control units. The application 42 may also be configured to operate when untethered from the vehicle 28, such as when the user is riding public transportation or walking. The application 42 may be further configured to communicate with servers via a communications network. The user may interact with the application 42 through the HMI of the vehicle associated electronic device 46, via a web interface, or via the HMI of the vehicle 28.

Figure 3:
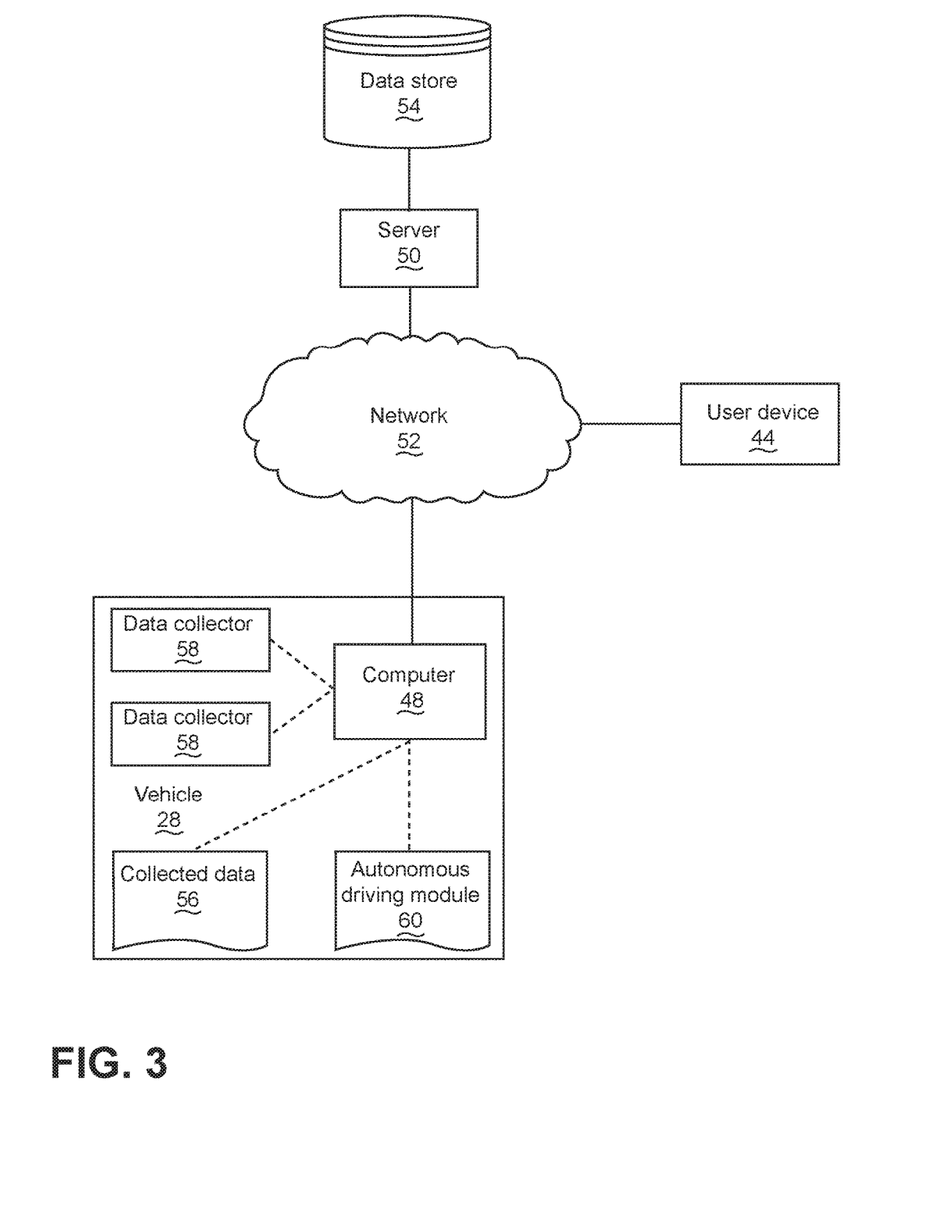
FIG. 3 is a block diagram of an exemplary autonomous vehicle system, according to one embodiment.

Referring to FIG. 3, the vehicle 28 may be a manually operated vehicle (i.e. using a human driver) or may be autonomously driven by an onboard computer 48. Additionally, or alternatively, the vehicle 28 may be remotely controlled (e.g., via an operator located in a different location). In autonomous embodiments, one of which is exemplarily illustrated in FIG. 3, the computer 48 may be configured for communicating with one or more remote sites such as a server 50 via a network 52. The one or more remote sites may include a data store 54. The vehicle 28, including the computer 48, is configured to receive information, e.g., collected data 56, from the one or more data collectors 58 related to various components of the vehicle 28, e.g., a steering wheel, brake pedal, accelerator pedal, gearshift lever, etc. The computer 48 generally includes an autonomous driving module 60 that includes instructions for autonomously, i.e., without some, or any, operator input, operating the vehicle 28, including possibly in response to instructions received from the server 50. Further, the computer 48, e.g., in the module 60, generally includes instructions for receiving data, e.g., from one or more data collectors 58 and/or a human machine interface (HMI), such as an interactive voice response (IVR) system, a graphical user interface (GUI) including a touchscreen or the like, etc.

By determining driver characteristics and/or vehicle 28 operating conditions, the module 60 may determine an appropriate control or controls to be applied to one or more vehicle components. For example, the module 60 may determine whether and when a steering wheel should be moved to mimic or approximate vehicle 28 steering being conducted as part of an autonomous driving operation, e.g., autonomous driving according to instructions from the server 50 and/or the module 60. The module 60 may determine passenger pickup locations, a specific vehicle 28 for each requested service, routes once a passenger is within the vehicle 28, time that the vehicle 28 will wait for a passenger, etc.

The vehicle computer 48 generally includes a controller 62 (FIG. 4) having a processor and a memory, the memory including one or more forms of computer-readable media, and storing instructions executable by the processor for performing various operations. Further, the computer 48 may include more than one computing device, e.g., controllers 62 or the like included in the vehicle 28 for monitoring and/or controlling various vehicle components, e.g., an engine control unit (ECU), transmission control unit (TCU), etc. The computer 48 is generally configured for communications on a controller area network (CAN) bus or the like. The computer 48 may also have a connection to an onboard diagnostics connector (OBD-II). Via the CAN bus, OBD-II, and/or other wired or wireless mechanisms, the computer 48 may transmit messages to various devices in the vehicle 28 and/or receive messages from the various devices, e.g., controllers 62, actuators, sensors, electronic devices 44, etc., including data collectors 58. In addition, the computer 48 may be configured for communicating with the network 52, which, may include various wired and/or wireless networking technologies, e.g., cellular, Bluetooth, wired and/or wireless packet networks, etc.

Instructions may be stored in and executed by the computer 48 in the autonomous driving module 60. Using data received in the computer 48, e.g., from the data collectors 58, the server 50, etc., the module 60 may control various vehicle 28 components and/or operations without a driver to operate the vehicle 28. For example, the module 60 may be used to regulate vehicle speed, acceleration, deceleration, steering, operation of components such as lights, windshield wipers, etc. Further, the module 60 may include instructions for evaluating information received in the computer 48 relating to vehicle operator characteristics, e.g., from the HMI and/or the data collectors 58.

The data collectors 58 may include a variety of vehicle equipment. For example, various controllers 62 in the vehicle 28 may operate as data collectors 58 to provide data 56 via the CAN bus, e.g., data 56 relating to vehicle speed, acceleration, etc. Further, sensors or the like, global positioning system (GPS) equipment, navigation systems, etc., could be included in the vehicle 28 and configured as data collectors 58 to provide data directly to the computer 48, e.g., via a wired or wireless connection. Sensor data collectors 58 could include mechanisms and/or sensors, such as RADAR, LIDAR, sonar, etc., that could be deployed to measure a distance between the vehicle 28 and other vehicles or objects. Yet other sensor data collectors 58 could include cameras, breathalyzers, motion detectors, seat sensors, etc., i.e., data collectors 58 to provide data for evaluating a condition or state and/or position of vehicle passengers. In addition, the data collectors 58 may include sensors to detect a position, change in position, rate of change in position, etc., of vehicle components such as a steering wheel, brake pedal, accelerator, gearshift lever, etc.

The network 52 represents one or more mechanisms by which a vehicle computer 48 may communicate with a remote server 50. Accordingly, the network 52 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 2.11, etc.), local area networks (LAN) and/or wide area networks (WAN), including the Internet, providing data communication services.

The server 50 may be one or more computer servers, each generally including at least one processor and at least one memory, the memory storing instructions executable by the processor, including instructions for carrying out various steps and processes described herein. The server 50 may include or be communicatively coupled to a data store 54 for storing the collected data 56, as well as parameters for evaluating operator input, e.g., parameters for a specific vehicle operator, a specific vehicle 28, particular weather or other environmental conditions, etc. Further, the server 50 may store information related to multiple vehicles 28, traffic conditions, weather conditions, etc., within a geographic area, with respect to a particular road, city, etc. The server 50 could also be configured to provide drive-by-wire instructions to vehicles 28 in an autonomous driving area, e.g., a road, etc., such as an "all stop" instruction for all vehicles 28 to stop, a speed restriction, a lane restriction, etc.

Figure 4:
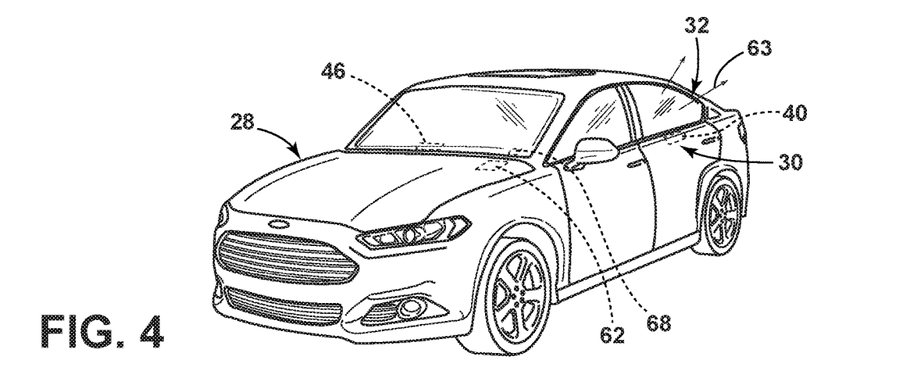
FIG. 4 is a front perspective view of the vehicle having the illumination assembly emanating light of a first wavelength.
Figure 5:
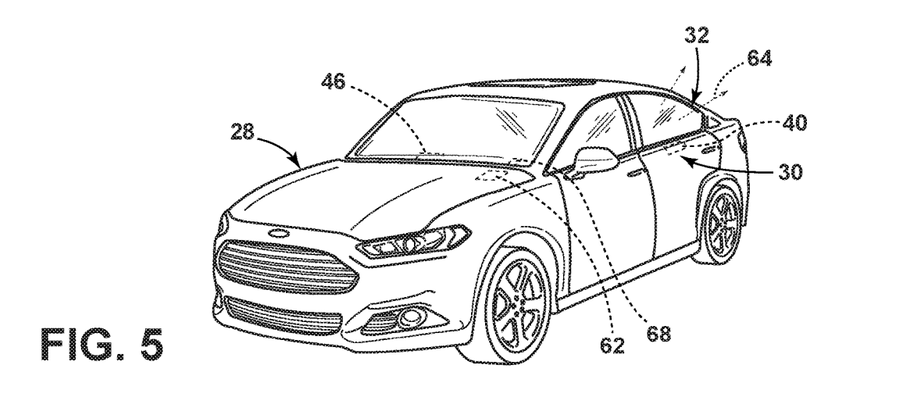
FIG. 5 is a front perspective view of the vehicle having the illumination assembly emanating light of a second wavelength.
Figure 6:
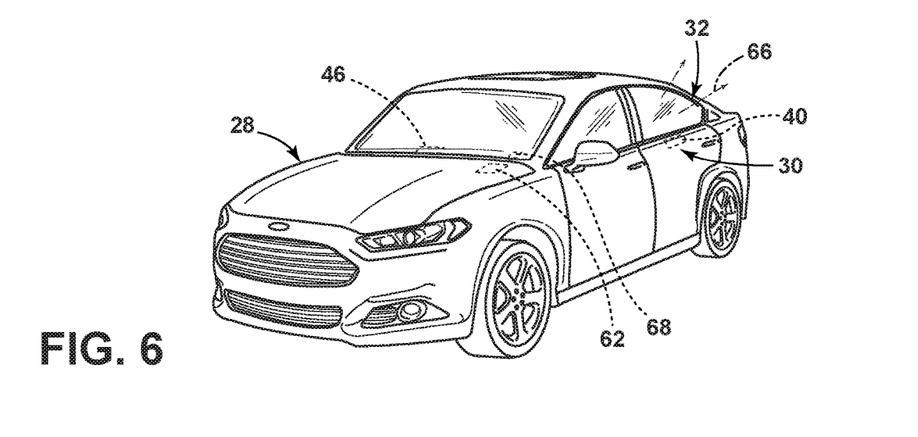
FIG. 6 is a front perspective view of the vehicle having the illumination assembly emanating light of a third wavelength.

Referring to FIGS. 4-6, when the vehicle 28 is utilized for commercial purposes, such as for ride providing and/or ride-sharing services, the vehicle 28 may wait for a passenger to enter the vehicle 28. The amount of time that the vehicle 28 waits may be at the discretion of the driver, a commercial entity's guidelines, and/or the discretion of the vehicle 28, when in an autonomous driving mode. Accordingly, it is contemplated that a timer within the vehicle 28 may begin when the vehicle 28 reaches a destination in which a passenger is to enter the vehicle 28. Once the predetermined amount of time is exceeded, the vehicle 28 and/or ride-sharing application 42 may deem the passenger a "no show" and arrange to pick up a new passenger.

To notify the passenger, or other persons disposed proximately to the vehicle 28 of the diminishing time for the passenger to enter the vehicle 28, the illuminated assembly 30 may provide messages and/or change color. For example, the illuminated assembly 30 may emit three wavelengths of light to communicate the time that the vehicle 28 will remain at the stop. In such instances, the illuminated assembly 30 may emit a first wavelength 63 (FIG. 4) of light in a first color spectrum (e.g., green) for a first predetermined amount of time (e.g., thirty (30) seconds) once the destination is reached by the vehicle 28. Next, if the passenger has not entered the vehicle 28, which may be sensed through the opening of the vehicle door, a seat sensor, or any other sensor within the vehicle 28, the illuminated assembly 30 may transition from the first wavelength 63 of light to a second wavelength 64 (FIG. 5) of light in a second color spectrum (e.g., yellow) for a second predetermined amount of time (e.g., one (1) minute). If the passenger still has not entered the vehicle 28, the illuminated assembly 30 may transition from the second wavelength 64 of light to a third wavelength 66 (FIG. 6) of light in a third color spectrum (e.g., red) for a third predetermined amount of time (e.g., thirty (30) seconds). In some embodiments, to provide additional time notifications to the passenger, the light sources 40 may blink, and possibly at higher intensities, in a final, fourth predetermined amount of time to notify the non-arrived passenger that the vehicle 28 will be leaving. It will be appreciated that the vehicle 28 and/or a driver of the vehicle 28 may alter the illumination sequence and/or predetermined periods of time from within the vehicle 28, through the vehicle associated electronic device 46, and/or remotely.

The controller 62 may further be in communication with an ambient light sensor 68. The ambient light sensor 68 may be operable to communicate a light condition, for example a level of brightness or intensity of the ambient light proximate the vehicle 28. In response to the level of the ambient light, the controller 62 may be configured to adjust a light intensity of the emitted light from the illuminated assembly 30. The intensity of the light output from the illuminated assembly 30 may be adjusted by the controller 62 by pulse-width modulation and/or controlling a duty cycle, current, or voltage supplied to the illuminated assembly 30.

Figure 7:
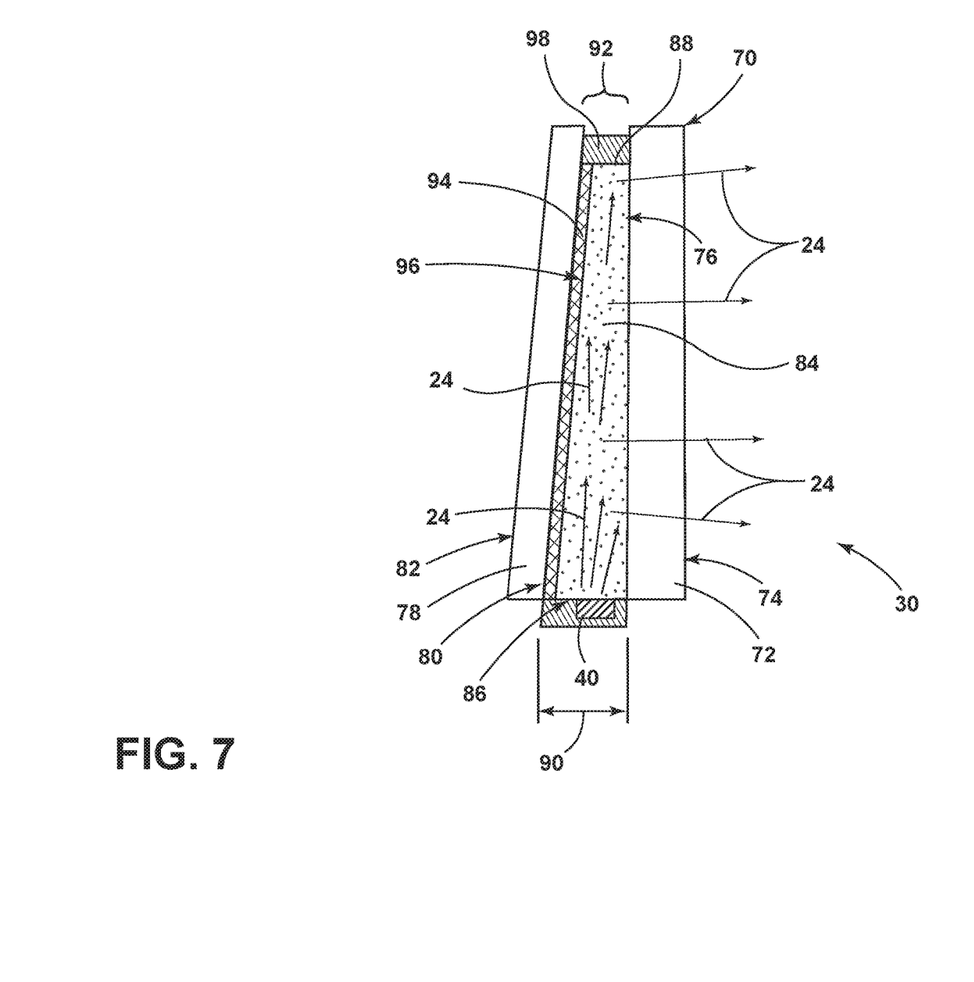
FIG. 7 is a cross-sectional view of the illuminated assembly depicted in FIG. 2 taken along the line VII-VII of FIG. 2, according to one embodiment.

Referring to FIG. 7, the illuminated assembly 30 includes a substrate 70 having an outer panel 72 with an exterior-facing surface 74 and an interior-facing surface 76. The exterior-facing surface 74 of the outer panel 72 faces outwardly from the vehicle 28, fixture, element, or other structure containing the assembly (not shown). The interior-facing surface 76 of the outer panel 72 faces the interior of the structure containing the assembly 30. Likewise, the illuminated assembly 30 further includes an inner panel 78 with an exterior-facing surface 80 and an interior-facing surface 82. In some embodiments, the outer panel 72 and the inner panel 78 are separated from one another. In alternate embodiments, the outer and inner panels 72, 78 may be attached to one another, or integrally formed with one another. Moreover, the substrate 70 may include a single panel in various embodiments.

In some aspects of the illuminated assembly 30, the outer and inner panels 72, 78 are fabricated from a glass or glass-ceramic composition that is processed according to methods (e.g., tempered) that may be suitable for use as a window 32 in a vehicular application. In some embodiments, the outer and inner panels 72, 78 may have a composition, and are processed, to achieve high optical transmissivity and transparency with little to no coloration. In some other embodiments of the assembly 30, the outer and inner panels 72, 78 can also be produced with some tinting, particularly in applications of the assembly 30 in which it is frequently exposed to direct sunlight (e.g., a moon roof application). Further, the outer and inner panels 72, 78 can range in thickness from about 2 to 15 mm in some embodiments.

Still referring to FIG. 7, the illuminated assembly 30 further includes a light-diffusing element 84. In some aspects of the assembly 30, the element 84 is a film, coating, or layer deposited onto the outer panel 72 and/or inner panel 78. In other embodiments, the element 84 is a layer affixed to or spaced from the outer panel 72 and/or inner panel 78. In some embodiments, the light-diffusing element 84 is fabricated from an acrylic polymer material containing light-diffusing particles (e.g., ACRYLITE® LED acrylic sheet from Evonik Cryo LLC). In other aspects, the light-diffusing element 84 includes a matrix of substantially transparent polymeric, glass or glass-polymeric material containing light-diffusing particles. These particles can be of similar sizes, or dissimilar sizes, and at concentrations sufficient to scatter excitation light 24 from the light source 40 that is operably coupled with the element 84.

As also depicted in FIG. 7, the illuminated assembly 30 includes the light source 40 that is configured to direct excitation light 24 into the element 84 through a first side portion 86 and towards a second, opposed side portion 88. The excitation light 24 travels within the light-diffusing element 84 and scatters off of the light-diffusing particles contained within the element 84.

With respect to the embodiments described herein, the light source 40 may be configured to emit visible and/or non-visible light, such as blue light, UV light, infrared, and/or violet light and may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the illuminated assembly 30. Further, various types of LEDs are suitable for use as the light source 40 including but not limited to top-emitting LEDs, side-emitting LEDs, and others. The scattered excitation light 24, which originated from the light source 40, then exits the light-diffusing element 84 as a scattered light pattern (e.g., 63, 64, 66 (FIGS. 4-6)) outwardly from, and/or towards the interior of, the structure containing the illuminated assembly 30 through the outer panel 72 and/or inner panel 78.

Referring again to FIG. 7, the light-diffusing element 84 can be further defined by a tapered profile. In certain aspects, the thickness 90 at the first portion 86 of the element 84 is greater than the thickness 92 at the second opposed portion 88. Consequently, the thickness of light-diffusing element 84 decreases or otherwise tapers according to a continuous or substantially continuous and constant fashion from the first opposed portion 86 to the second opposed portion 88. The tapered nature of the light-diffusing element 84 serves to improve the uniformity of the scattered light pattern that emanates from the element 84 between the first and second opposed portions. The smaller thickness 92 of the element 84 at the second opposed portion away from the light source 40 (i.e., as compared to the thickness 90 at the first opposed portion) serves to offset the higher degree of light loss associated with the excitation light 24 at this location compared to other locations within the element 84. That is, light loss associated with the excitation light 24 increases as a function of distance from the light source 40 within the light-diffusing element 84, assuming a constant thickness of the element 84. By reducing the thickness of the element 84 along this same path, the degree of light loss can be offset by the thickness reduction, leading to improved uniformity in the scattered light pattern that emanates from the light-diffusing element 84 outwardly from, and/or into, the structure containing the illuminated assembly 30.

Again referring to FIG. 7, the illuminated assembly 30 includes a light-diffusing element 84 having a non-continuous or non-constantly changing profile in which the thickness 90 at the first opposed portion 86 is greater than the thickness 92 at the second opposed portion 88. For example, in one embodiment, the thickness of the element 84 changes in a stepped function between the first and second opposed portions 86, 88. In another embodiment, the thickness of the element 84 continuously changes according to a non-linear function between the first and second portions 86, 88.

As also depicted in FIG. 7, a light barrier 94 may be disposed between the light diffusing element 84 and the inner panel 78 or otherwise disposed within the illuminated assembly. In some embodiments, an exterior-facing surface 96 on the light barrier 94 is mirror-like with high specular reflectivity. For example, the reflective exterior-facing surface 96 can be a highly reflective coating applied through vacuum metallization (e.g., a vacuum-metallized chromium coating from Leonhard Kurz Stiftung & Co. KG ("Kurz")). The light barrier 94 can serve to reflect excitation light 24 from the light source 40 within the light-diffusing element 84. The barrier 94 may also provide for a tinting of the windows of the vehicle 28.

In the illuminated assembly 30 depicted in FIG. 7, the light barrier 94 is disposed over an interior-facing surface of the light-diffusing element 84. In some aspects, the light barrier 94 is a film, coating, or layer deposited directly onto the interior-facing surface of the light-diffusing element 84. In other aspects, the light barrier 94 is a film or layer adhered to the light-diffusing element 84 with an adhesive with high optical clarity. Such adhesives used to affix the barrier 94 to the outer panel 72 and/or inner panel 78 can be transparent or tinted, depending on the level of collective tinting necessary in the substrate 70 and the light barrier 94 for the illuminated assembly 30. The light barrier 94 may be disposed over a plurality of surfaces. For example, the light barrier 94 may be disposed over an interior-facing surface of the light-diffusing element 84 and two opposed portions of the light-diffusing element 84. Accordingly, light may be reflected with the light-diffusing element 84 and directed outwardly from the vehicle 28.

Referring again to FIG. 7, the outer and inner panels 72, 78 may extend above the light-diffusing element 84 and the light barrier 94. An edge seal 98 that is configured to seal the light barrier 94 and the light-diffusing element 84 may be disposed between the light-diffusing element 84 and light barrier 94. In some aspects, the seal 98 is a thermoset, polymeric and/or elastomeric material that can be applied with a relatively low viscosity to seal these features (e.g., barrier 94 and element 84) before curing. In other aspects of the illuminated assembly 30, the seal 98 is a thermoplastic material that is applied with a relatively low viscosity at an elevated temperature and cooled to seal these features (e.g., barrier 94 and element 84). In certain embodiments, the seal 98 can be formed over these features of the assembly 30 to provide a hermetic and corrosion-resistant seal over them.

Figure 8:
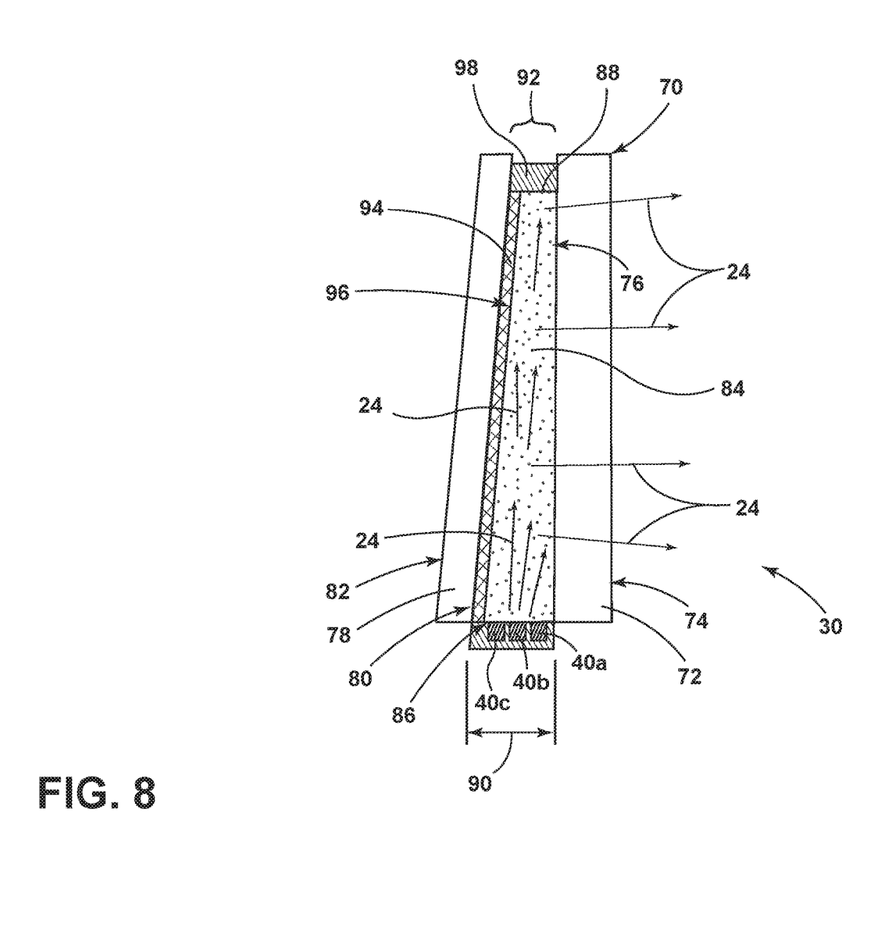
FIG. 8 is a cross-sectional view of the illuminated assembly depicted in FIG. 2 taken along the line VII-VII of FIG. 2, according to an alternate embodiment.

Referring to FIG. 8, an illuminated assembly 30 includes the outer and the inner panel 72, 78, the light-diffusing element 84, and the light barrier 94. In addition, the illuminated assembly 30 includes a plurality of light sources 40a, 40b, 40c configured to direct excitation light 24 into the first portion 86. In most respects, the illuminated assembly 30 depicted in FIG. 8 is comparable to the illuminated assembly 30 exemplarily illustrated in FIG. 7, and like-numbered elements have substantially the same or identical structure and function.

In various embodiments, the first light source 40a may emit the first wavelength of excitation light 24, a second light source 40b may emit a second wavelength of excitation light 24, and a third light source 40c may emit a third wavelength of excitation light 24. However, it is contemplated that the illuminated assembly 30 may include any number of light sources 40a, 40b, 40c disposed in any number (one or more) sets that emit various wavelengths of light. Moreover, each light source 40a, 40b, 40c may emit a wide range of wavelengths therefrom.

It should also be understood that the illuminated assembly 30 can be controlled with various schemes and arrangements as understood by those in the operative field. For example, the light source 40 or sources 40a, 40b, 40c of the illuminated assembly can be coupled to a power source, the controller 62, and/or a switch (not shown). According to various embodiments, the controller 62 may further be coupled with the user's electronic device 44 and/or vehicle associated electronic device 46 for determining a destination of the vehicle 28 and whether the to-be-picked-up passenger is still planning on entering the vehicle 28. The controller 62 may illuminate the light source 40 or sources 40a, 40b, 40c in a plurality of wavelengths to notify persons proximate the vehicle 28 of the status of the vehicle 28.

The illuminated assembly 30 can be fabricated according to various methods and sequences. In one exemplary method, a light barrier 94 (e.g., a vacuum-metallized film from Kurz serving as a light barrier 94) is formed with a vacuum metallization process within a mold, and then a light-diffusing element 84 (e.g., a light-diffusing element 84 fabricated from an ACRYLITE® LED film) is insert-molded onto the barrier 94. The light barrier 94/light-diffusing element 84 is then sandwiched between an outer panel 72 and an inner panel 78 (e.g., glass substrates 70 suitable for an automobile window) with a spray adhesive (e.g., 3M™ Optically Clear Adhesive 8172). Next, the outer panel 72 and/or inner panel 78, the light barrier 94, and the light-diffusing element 84 can be sealed at the portions of the assembly 30 with a silicone overmold or other type of sealing material. Upon completion of the sealing step, the completed illuminated assembly 30 can be installed into a structure, vehicle 28, or other device, depending on its intended application.

Figure 9:
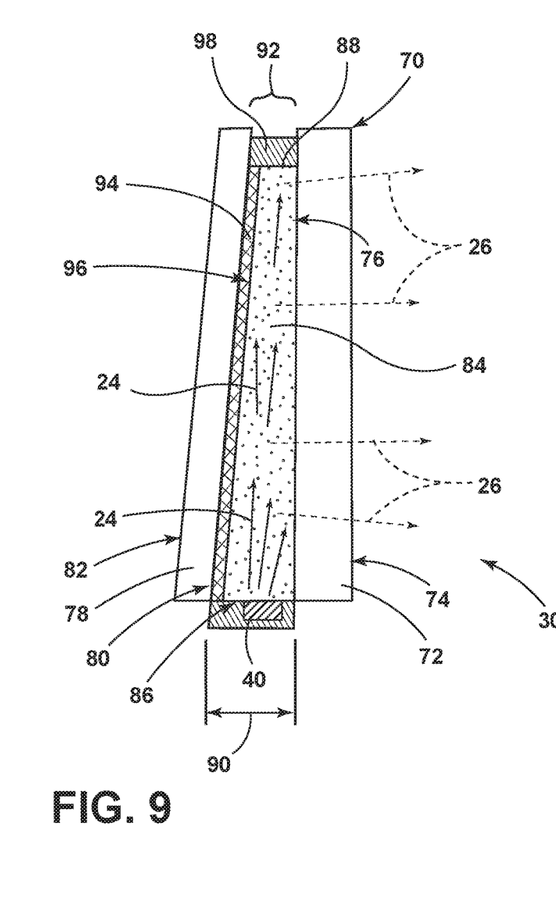
FIG. 9 is a cross-sectional view of the illuminated assembly depicted in FIG. 2 taken along the line VII-VII of FIG. 2, according to an alternate embodiment, having a luminescent structure disposed within a light-diffusing element.
Figure 10:
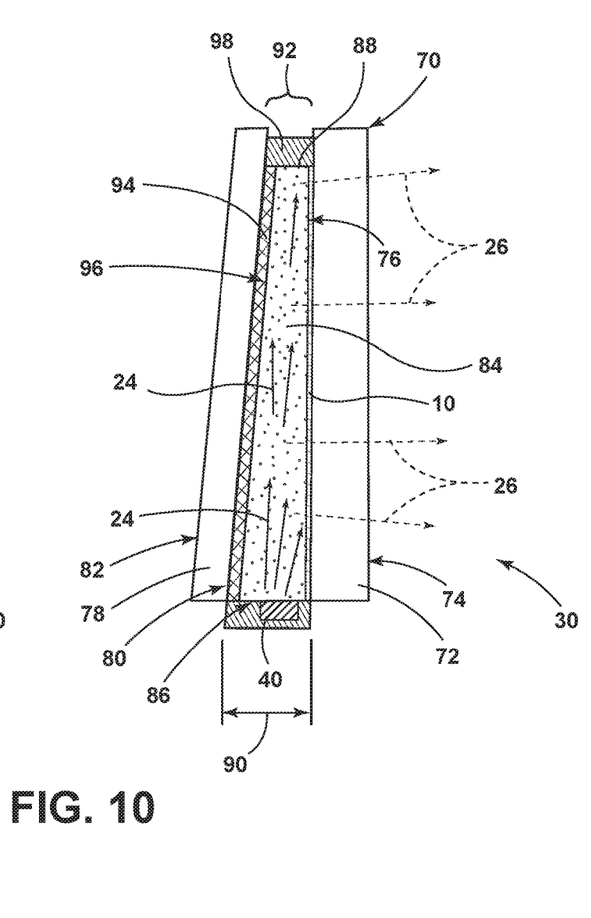
FIG. 10 is a cross-sectional view of the illuminated assembly depicted in FIG. 2 taken along the line VII-VII of FIG. 2 having a luminescent structure disposed between the light-diffusing element and an outer panel, according to an alternate embodiment.

Referring to FIGS. 9 and 10, the luminescent structure 10 may be disposed within the light-diffusing element 84 (FIG. 9) and/or optically coupled with an outer surface of the light-diffusing element 84 (FIG. 10). In operation, the luminescent structure 10 may include a plurality of luminescent materials therein that luminesce in response to receiving light of a specific wavelength. Accordingly, when a first wavelength of light (e.g., green) is to luminesce, the light source 40a may emit excitation light 24 of a first wavelength. When a second wavelength of light (e.g., yellow) is to emanate from the window, the light source 40b may emit excitation light 24 of a second wavelength. Likewise, when a third wavelength of light (e.g., red) is to emanate from the window, the light source 40c may emit excitation light 24 of a third wavelength.

According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

A variety of advantages may be derived from the use of the present disclosure. For example, use of the illumination assembly disclosed herein provides persons disposed proximately the vehicle of the state of the vehicle. Moreover, the illumination assembly disclosed herein provides a passenger of the vehicle with notifications of how much time they have remaining before the vehicle is to leave. The illumination assembly may be manufactured at low costs when compared to standard vehicle badge assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illuminated assembly, comprising:
   a light-diffusing element disposed between an outer panel and an inner panel, wherein a thickness of the light-diffusing element at a first portion is greater than a thickness at a second, opposed portion;
   a first seal disposed between and contacting the outer and inner panels, the outer and inner panels extending vertically above the first seal on an upper portion thereof;
   a second seal extending outwardly of a lower portion of the outer and inner panels;
   a light source disposed within the second seal and configured to direct light upwardly through the light-diffusing element and movable with the outer and inner panel; and
   a controller configured to illuminate the light source in various wavelengths based on a vehicle wait time.

2. The illuminated assembly of claim 1, wherein the light-diffusing element comprises an acrylic polymer matrix and light-diffusing particles.

3. The illuminated assembly of claim 1, wherein the assembly is configured as a side window for a vehicle to selectively emanate a light pattern outward from the vehicle.

4. The illuminated assembly of claim 1, wherein the seal comprises a polymeric material that is configured to seal a side portion of the light-diffusing element.

5. The illuminated assembly of claim 1, wherein the thickness of the light-diffusing element is tapered across the light-diffusing element between the first portion and the second opposed portion.

6. The illuminated assembly of claim 1, further comprising:
   a luminescent structure disposed between the outer and the inner panels and configured to luminesce in response to receiving excitation light from the light source.

7. An illuminated assembly, comprising:
   an outer and an inner panel;
   a light-diffusing element disposed between the outer and the inner panels having first and second portions, wherein a thickness of the element at the first portion is greater than a thickness at the second portion;
   a plurality of light sources configured to direct light into the first portion, wherein the light sources illuminate in a plurality of wavelengths based on a vehicle wait time, the light sources movable with the outer and inner panels;
   a first edge seal disposed between an inner surface of the outer panel and an inner surface of the inner panel on a first end portion of the light-diffusing element, the outer and inner panels both extending vertically above the seal; and
   a second edge seal disposed at a second portion of the light-diffusing element, wherein the light sources are disposed within the seal.

8. The illuminated assembly of claim 7, wherein the light-diffusing element comprises an acrylic polymer matrix and light-diffusing particles.

9. The illuminated assembly of claim 7, wherein the vehicle wait time is a predefined amount of time that a vehicle waits for a passenger to enter the vehicle.

10. The illuminated assembly of claim 7, wherein the assembly is configured as a side window for a vehicle to selectively emanate a light pattern outwardly from the vehicle.

11. The illuminated assembly of claim 7, wherein said illuminated assembly is disposed on a vehicle that is capable of autonomous functionality.

* * * * *